May 12, 1964

D. J. CHEESMAN ETAL 3,132,697

HELICOPTER CONTROL SYSTEM

Filed Dec. 8, 1960

INVENTOR.
Donald J. Cheesman
Edward Lazz
BY T W Secrest

May 12, 1964

D. J. CHEESMAN ETAL 3,132,697

HELICOPTER CONTROL SYSTEM

Filed Dec. 8, 1960

INVENTOR.
Donald J. Cheesman
Edward Lazz
BY
TW Secrest

May 12, 1964

D. J. CHEESMAN ETAL 3,132,697

HELICOPTER CONTROL SYSTEM

Filed Dec. 8, 1960

INVENTOR.
Donald J. Cheesman
Edward Lazz
BY
T W Secrest

May 12, 1964  D. J. CHEESMAN ETAL  3,132,697
HELICOPTER CONTROL SYSTEM
Filed Dec. 8, 1960  5 Sheets-Sheet 5
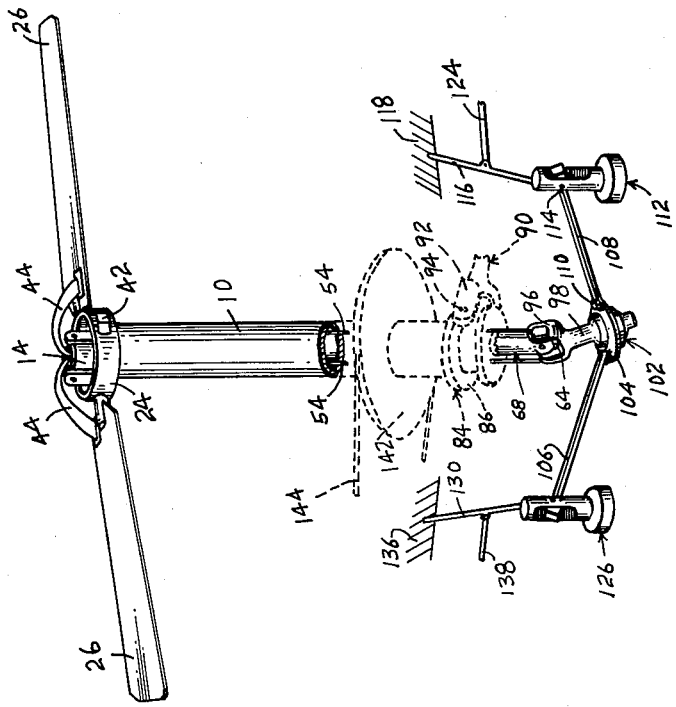
INVENTOR.
Donald J. Cheesman
Edward Lazz
BY
J W Secrest

United States Patent Office 3,132,697
Patented May 12, 1964

---

3,132,697
HELICOPTER CONTROL SYSTEM
Donald J. Cheesman, 426 B St. SW., Ephrata, Wash., and Edward Lazz, Box 707, Soap Lake, Wash.
Filed Dec. 8, 1960, Ser. No. 74,542
7 Claims. (Cl. 170—160.13)

This invention relates to a control system for helicopters and, more particularly, to the collective pitch control and also to the cyclic pitch control wherein different attitudes of the helicopter are taken into account for the cyclic pitch control.

This control system automatically compensates for the longitudinal tilting and the lateral tilting of the helicopter so that the pilot need not ride the controls as much as with previously used control systems. Also, the design of this system is such that the hub can be enclosed and streamlined to a degree so as to reduce drag by the helicopter. Further, with this system it is possible to lower the center of gravity of the helicopter so as to make the same more stable. The above advantages are accomplished with a simpler design and construction of the power plant and rotor blades of the helicopter; fewer ball bearing joints than previously employed which results in a control system requiring less maintenance than previously employed systems and also means lower initial cost for the control system. These and other important improvements and advantages of our control system will be brought out more fully with reference to the accompanying drawings, following detailed specification and appended claims.

Figure 1:
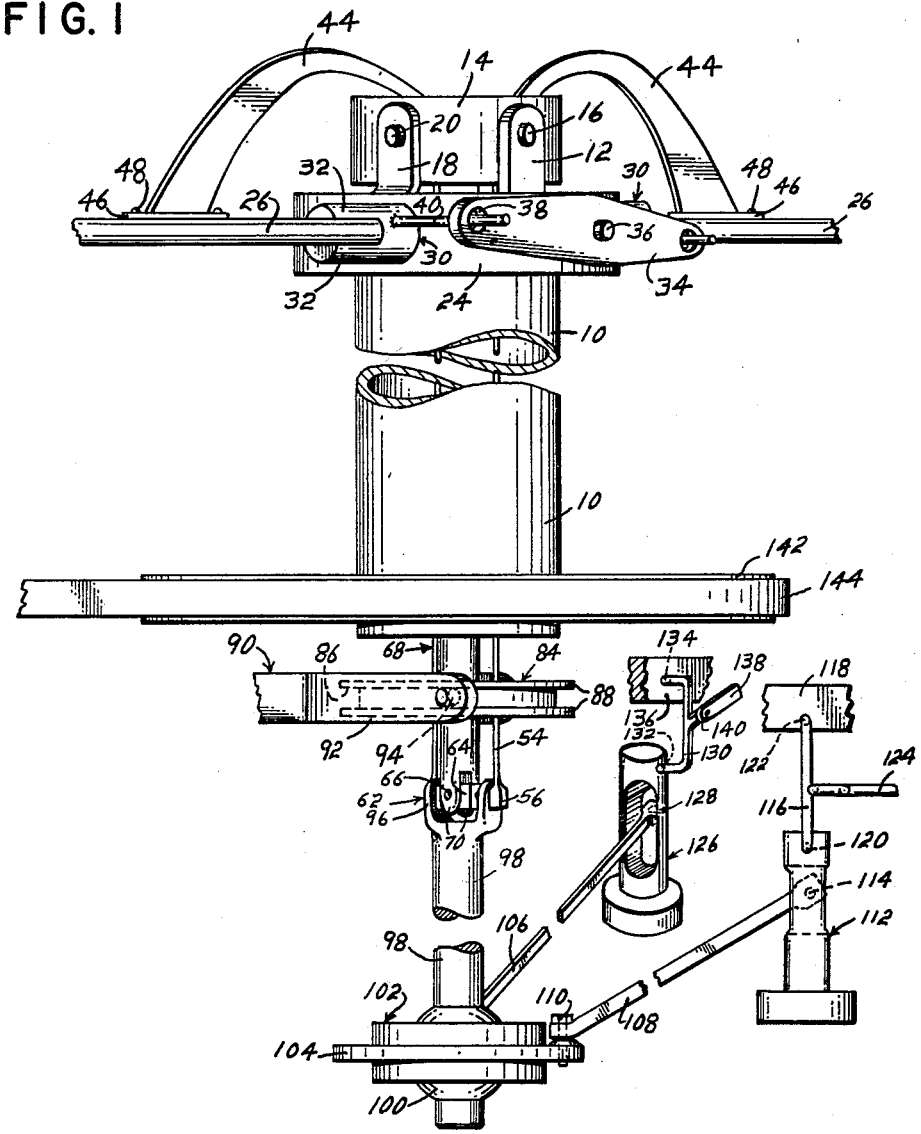
FIGURE 1 is a fragmentary elevational view illustrating the rotor mast, the rotor blades, the collective pitch control mechanism and the cyclic pitch control mechanism including the pivoted weights.

FIGURE 6 is a vertical cross-sectional view of the rotor mast and the control mechanism and illustrates the pitch shaft in a raised position so as to increase the collective pitch of the rotor blades; and, FIGURE 7 is an isometric view looking down on the rotor mast, the rotor blades, and brings forth the movement of the lateral pitch control weight and the longitudinal pitch control weight so as to vary the cyclic pitch control mechanism and thereby the cyclic pitch of the rotor blades.

Referring to the drawings, it is seen that the invention comprises a cylindrical tubular rotor mast 10. Attached to the outside wall of the mast 10 and near the upper end are two upwardly directed lugs 12. These lugs are spaced 180 degrees apart.

The gimbal ring 14 is pivoted by pins 16 to the lugs 12. This ring is free to rotate on the pins 16.

Attached to the gimbal ring 14 are two depending lugs 18. These two lugs are attached by means of pivots 20, and are positioned between the two lugs 12, i.e., approximately 90 degrees from the lugs 12. The lug 18 on its lower end projects outwardly into a rim 22.

The outer edge of the rim 22 is welded to a rotor hub 24. The rotor hub is of a larger internal diameter than the external diameter of the rotor mast 10 and the gimbal ring 14.

Two rotor blades 26 are pivotally attached to the rotor hub 24 by means of pins 28.

Positioned between the inner edge of the blade 26 and the rotor hub 24 is a spacer block 30 having forked fingers 32 for fitting over the inner end of the blade 26. The rotor blade 26 and the spacer block 30 are free to rotate on the pin 28. The two rotor blades 26 are spaced 180 degrees apart.

An equalizer bar 34 is pinned at 36 to the rotor hub 24. The bar 34 is substantially parallel to the two spaced-apart spacers 30. This bar is free to rotate on the pin 36. Near its two ends are passageways 38. Each of these passageways 38 receives a pin 40. The pin 40 is integrally secured at its inner end to a respective spacer block 30. The outer end of the pin 40 projects through the passageway 38.

Also attached to the rotor hub 24, and spaced approximately 180 degrees from the pin 36, is a counterbalancing weight 42. The weight 42 counterbalances the weight of the pin 36, the equalizer bar 34 and then pins 40.

Attached to the trailing edge of the upper surface of each blade 26 is a pitch horn 44. This pitch horn may connect with the blade 26 by means of a plate 46 and rivets 48.

The pitch horn 44 extends inwardly and over the top of the gimbal ring 14 and down into said ring. On its inner end the horn 44 terminates in a ball 50. The ball 50 cofits with a socket 52 on the end of push-pull rod 54. The lower end of the rod 54 terminates in a socket 56. The sockets 56 cofit with ball joints 58 on the end of cross 60 of the universal joint 62.

The cross 60 of the universal joint 62, in addition to the ball joints 58, comprises an enlarged central part 64. The part 64 of the cross 60 is pinned at 66 to the lower end of shaft 68. The lower end of the shaft 68 terminates in forked members 70. The pin 66 passes through the forked members 70 and the part 64 so as to allow the part 64 and the shaft 68 to rotate with respect to each other. The upper end of the shaft 68 is grooved to form a keyway 72 which receives key 74. The key 74 is tightly positioned in the keyway 72.

The upper end of the shaft 68, referred to as the collective pitch shaft, and the key 74 move in a plug 76 near the lower of the rotor mast 10. In the plug 76 is a passageway 78 having an enlarged region 80 for receiving the keyway 74. The passageway 78 and the enlarged region 80 cofit loosely with the shaft 68 and the keyway 74. More particularly, the shaft 68 can be moved through the passageway 78; but, upon the rotation of the plug 76 and the rotor mast 10, the shaft 68 rotates. In other words, the key 74 may be considered to be the equivalent of a gear tooth with respect to the passageway 80 in the plug 76.

The plug 76 also has two spaced-apart passageways 82 near its periphery. The push-pull rods 54 extend through these passageways 82. The plug 76 is tack welded to the rotor mast in its inner surface. At approximately the central section of the collective pitch shaft 68, there is positioned a collective pitch ring 84. The plane of the pitch ring 84 is substantially at right angles to the longitudinal axis of the pitch shaft 68. The ring may be attached to the shaft by tack welding or other suitable means.

The ring 84 has a circumferential groove 86 defined by two peripheral ribs 88.

A collective pitch fork 90 having spaced-apart fingers 92 cofits with the pitch ring 84. More particularly, the fingers 92 on their inner surfaces have inwardly directed studs 94 which cofit with the groove 86 in the ring.

The collective pitch fork is under the control of the pilot of the helicopter. It is to be realized that the fingers 92 and the studs 94 can be raised and lowered so as to raise and lower the collective pitch shaft 68 and thereby collectively raise and lower the push-pull rods 54.

Returning now to the universal joint 62, it is seen that this joint comprises a yoke having fingers 96 on the upper end of the shaft 98. The fingers 96 have passageways through which the cross joint 60 runs, viz., the finger 96 is between the ball joint 58 and the enlarged central part 64.

On the lower end of the shaft 98, cyclic pitch control arm 98, there is a spherical ball-like enlargement 100. Cofitting with this ball 100 is a self aligning bearing 102 having a circumscribing rim 104.

Attached to the rim 104 are two rods 106 and 108. The arm 108 is attached by means of pin 110. The arm 108 has a passageway in its end and through which passageway the pin 110 extends and connects with the rim 104. The passageway fits loosely around the pin 110 so as to allow some freedom of lateral action and movement. The other end of the arm 108 is attached to a freely swinging pendulum or weight 112. The arm is attached by means of a pin 114 which extends through a passageway in the upper end of the arm and connects with the pendulum. Again, the arm 108 fits loosely around the pin 114 so that the arm 108 and the pendulum 112 are free to rotate with respect to each other. The upper end of the pendulum 112 is attached by means of a link 116 to the stationary member 118 of the helicopter. A pin 120 connects the linkage 116 and the pendulum 112 in such a manner that the pendulum is free to rotate on the pin 120. Also, the pin 122 connects the linkage 116 to the stationary member 118 in such a manner that the linkage is free to rotate around said pin 122. A control rod 124 and the linkage 116 is a pivoting connection so that it is possible to move the rod 124 and thereby move the linkage 116. The rod 108 may be considered to be the fore and aft pitch control rod or the longitudinal pitch control rod. It is seen that when the helicopter is directed downwardly, longitudinally speaking, the linkage 116, see FIGURE 5, moves to the left so as to move the control rod 108 to the left and thereby the cyclic pitch control arm 98 to the left. This raises one of the push-pull rods and lowers the other so as to vary the cyclic pitch on the blades. By this there is an automatic correction of the position of the helicopter upon the longitudinal movement.

The control rod 106 is rigidly positioned to the rib or rim 104. This rod may be positioned by tack welding or by a fixed pin or other suitable means.

The rod 106 on the other end is pivoted to a weight or pendulum 126. A pin 128 connects the rod 106 and the pendulum 126 in such a manner that the two are free to rotate with respect to each other. The pendulum 126 is pinned to a linkage 130 at 132. The linkage 130 is pinned at 134 to a stationary part of the helicopter 136. The linkage 130 is free to rotate with respect to the part 136 and the pendulum 126 is free to rotate with respect to the linkage 130. A control rod 138 is pinned at 140 to the linkage 130. The control rod 138 is free to rotate with respect to the linkage 130. The control rod 138 is connected by suitable linkage to the pilots control. The control rod 106 may be referred to as the lateral pitch control rod.

A schematic representation of the drive for the rotor mast is presented in the drawings. More particularly, there is tack welded to the rotor mast 10, a pully wheel 142. A belt 144 interconnects the pully wheel 142 and suitable drive for the belt. It is to be realized that in place of the pully wheel and the belt drive there may be used a gear drive. Also, there is provided suitable support for the rotor mast in the helicopter.

Figure 2:
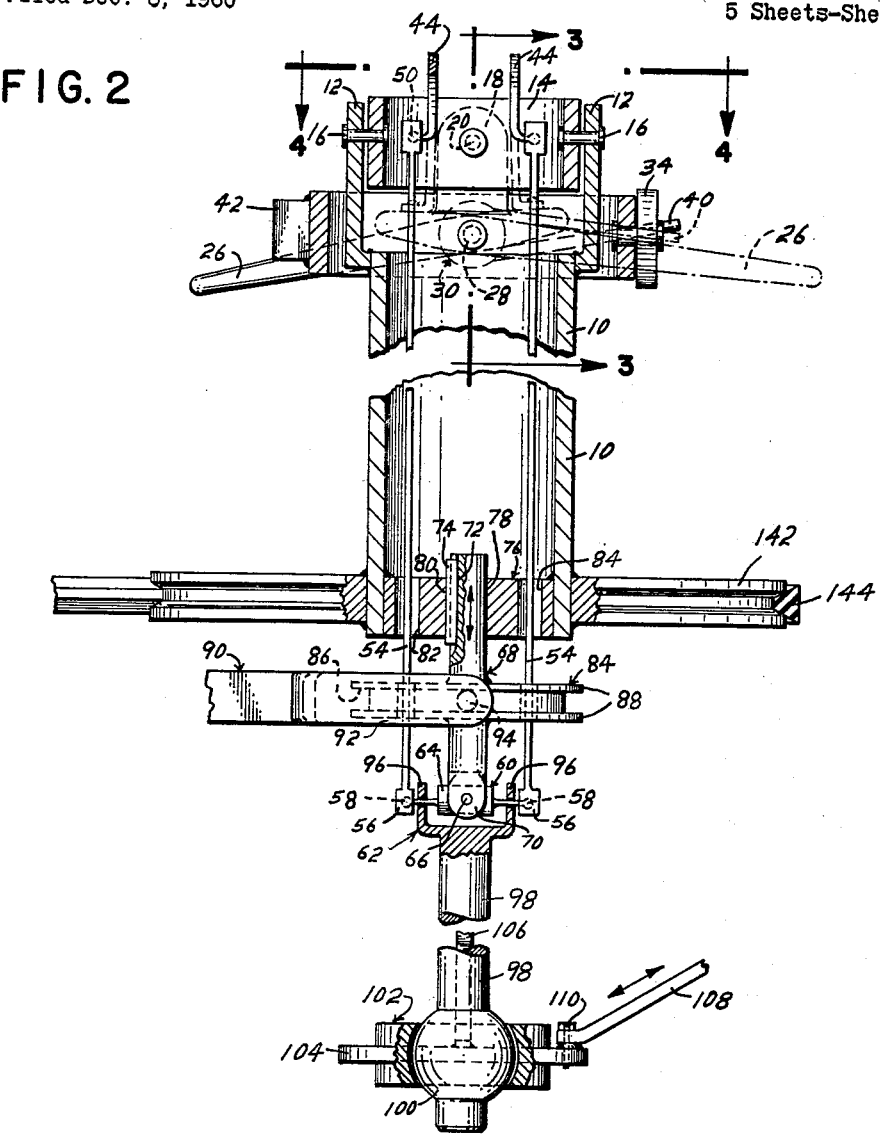
FIGURE 2 is a vertical cross-sectional view of the rotor mast and illustrates the push-pull rods in the rotor mast, the collective pitch control mechanism for controlling the push-pull rods, and the cyclic control mechanism for controlling the push-pull rods.
Figure 3:
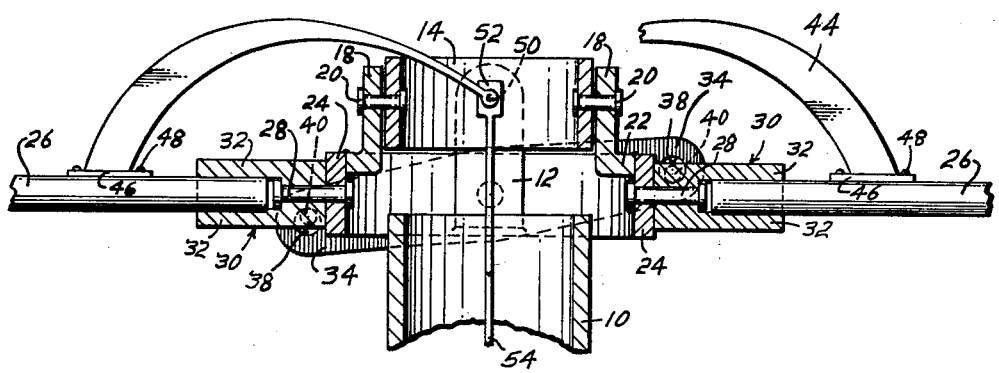
FIGURE 3 is a fragmentary vertical cross-sectional view of the upper part of the rotor mast and illustrates the connection of the push-pull rods with the pitch horn, the connection of the pitch horn with rotor blades, and the connection of the rotor blades with the mast, and is taken on line 3—3 of FIGURE 2.
Figure 4:
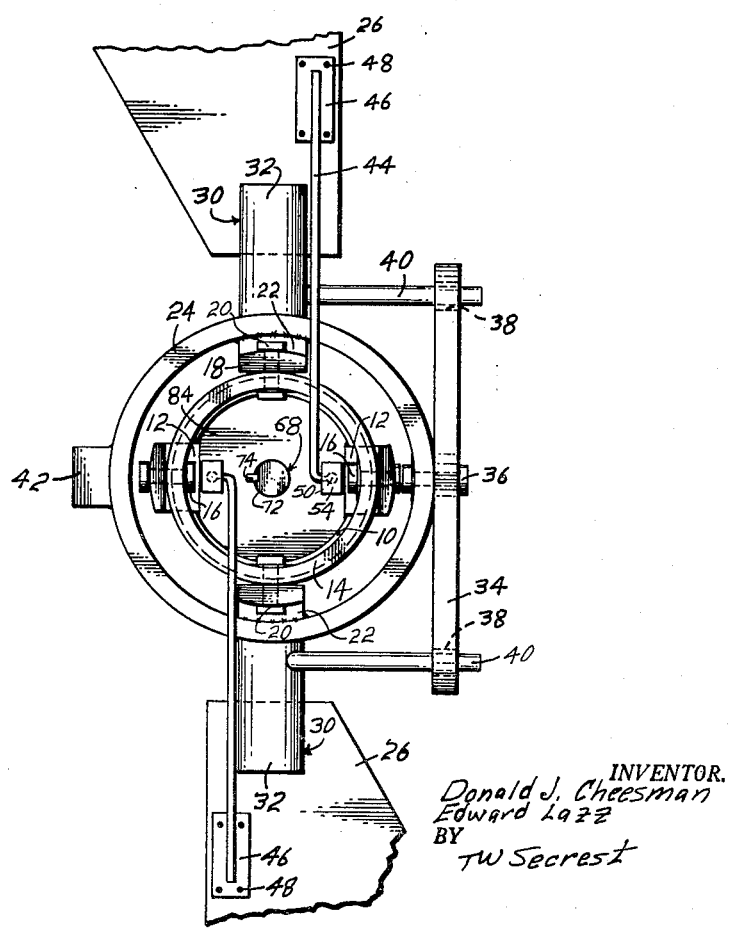
FIGURE 4 is a plan view looking down on the rotor mast and illustrates the arm of the pitch horn's connection with the rotor blades, the stabilization mechanism for the rotor blades, and is taken on line 4—4 of FIGURE 2.

In the operation of the control, it is seen that both the collective control and the cyclic controls can be operated concurrently. An illustration of the operation of the collective control is as follows, see FIGURES 2 and 6. In FIGURE 2 the collective pitch shaft 68 is relatively far down and the collective pitch of the blades 26 is not very great. The pitch of the blades 26 may be increased by moving the pitch shaft 68 upwardly and somewhat through the passageway 78 and 80 in the plug 76. This raises the push-pull rods 54 so as to increase the pitch of the blades 26.

Figure 5:
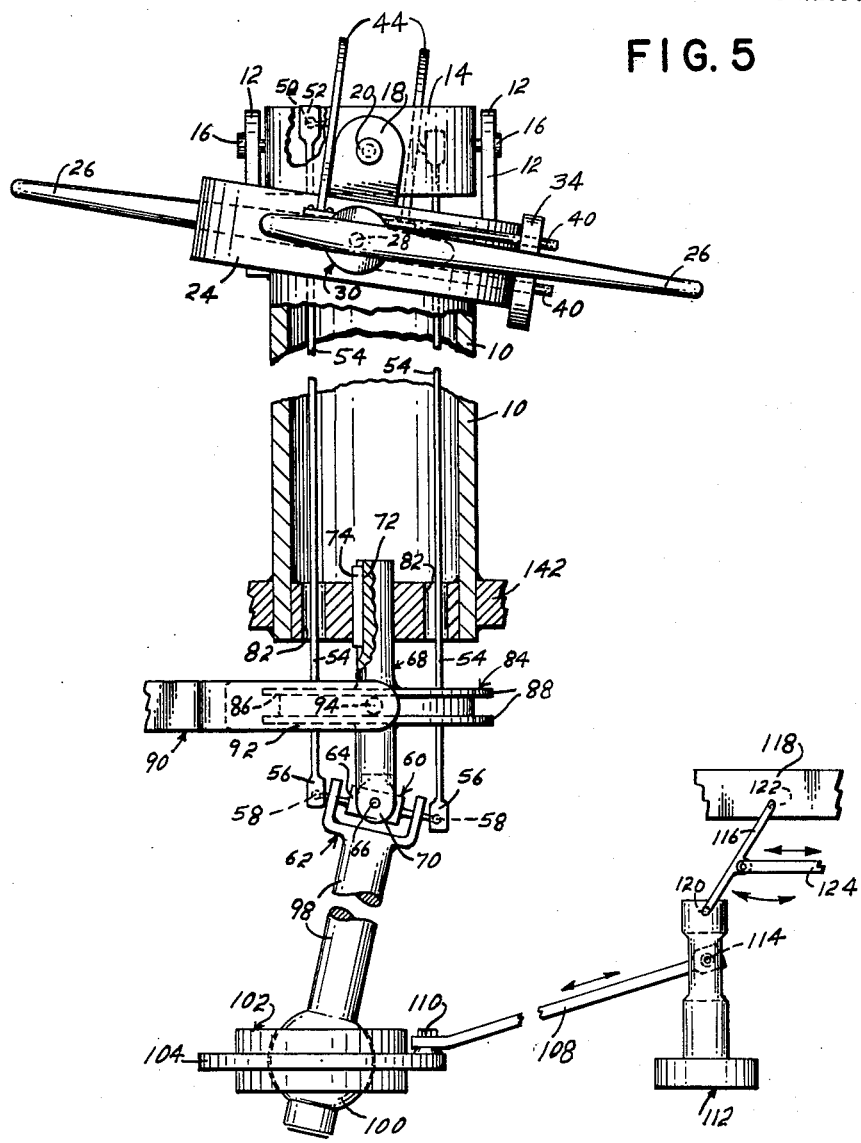
FIGURE 5 is a vertical cross-sectional view of the rotor mast, the pitch horn, and the control of the cyclic pitch of the rotor blades by one of the suspended weights of the cyclic pitch control mechanism wherein the weight moves the cyclic pitch control arm so as to lower one of the push-pull rods and to raise the other push-pull rod to tilt the rotor hub.

The cyclic control pitch arm may be varied by moving the control rod 124 and/or the control rod 138. In this regard see FIGURE 5 wherein the control rod 108 has been moved so as to vary the position of the cyclic pitch control arm 98. By so varying the position of the cyclic pitch control arm 98, the push-pull rods 54 are moved. In FIGURE 5 it is seen that the rotor hub 24 has been rotated around pivot 20.

In FIGURE 7 there is illustrated the movement of the cyclic pitch control arm 98 when the helicopter is off balance both with respect to the longitudinal position and with respect to the lateral position. The movement of the control arm 98 in this instance is automatically taken care of by the positioning of the pendulums 112 and 126. With the helicopter out of position both longitudinally and laterally, the pendulum 112 will move longitudinally and the pendulum 126 will move laterally. As a result, the connecting rod 108 will be moved and the connecting rod 106 will be moved so as to move the cyclic control pitch arm 98. Therefore, the push-pull rods 54 are moved so as to move the pitch horns 44 and vary the cyclic pitch of the blades 26. Of course, if the helicopter is out of position longitudinally only, or laterally only, the corresponding pendulum 112 or 126 will control the movement of the cyclic pitch control arm 98 and the push-pull rods 54.

It is to be noticed that the position of the two push-pull rods 54 with respect to the position of the two blades 26 is substantially that of right angles to each other, i.e., referring to FIGURE 1, if a vertical plane were situated to include the two push-pull rods 54 and, also, if a vertical plane were positioned to be along the longitudinal axis of the two blades 26, these two vertical planes would be at substantially right angles to each other. If the longitudinal position of the helicopter is not correct, then the pendulum 112 has been moved so as to move the cyclic pitch control arm 98. This varies the pitch of the blades. However, since the pitch of the helicopter and the pitch of the blades are approximately 90 degrees out of alignment, it is seen that the cyclic pitch control varies with the blades upon the successive 90 degree rotation. Likewise, if the lateral position of the helicopter is that which is not correct, then the pendulum 126 is out of position and the cyclic pitch control arm is moved so as to vary the pitch of the blades. Again, the push-pull rods 54 are approximately 90 degrees out of alignment with the blades 26. The pendulum 126 has the effect on the lateral positioning of the blades during the successive quadrant of rotation. It is to be realized that the longitudinal position of the cyclic control pitch arm and the lateral position of the cyclic control pitch arm and the position of the collective pitch shaft may all be varied simultaneously.

By way of repetition, it is to be realized that the gimbal ring 14 rotates on pins or pivots 16 connected to the rotor mast. And, that the rotor hub 24 rotates on pins or pivots 20. The pins 16 are approximately 90 degrees out of alignment with the pivots 20. As a result, it is possible to have a substantially complete movement of the rotor hub 24. It is possible by these means for the blades 26 to maintain themselves in substantially the same plane of rotation even though the vertical position of the rotor mast varies to a moderate degree. This maintaining of the blades in substantially the same plane of rotation is possible even though the collective pitch of the blades is varied.

In regard to the control rod 108 and its connection with the rim 104 by means of the pin 110, it is emphasized that this control rod is free to move laterally slightly with respect to the pin 110. The rod 106 is fixedly positioned with respect to the rim 104. By having the rod 108 movably positioned, it is possible to vary the position of the cyclic pitch control 98 by the shifting of the position of the pendulums 112 and 126. If both of the rods 106 and 108 are fixedly positioned with respect to the rim 104, it would not be possible to move the cyclic pitch control arm 98 by the pendulums 112 and 126.

The equalizer bar 34 maintains a constant relationship between the blades 26 and the hub 24, so that the hub always maintains a mean position between the angle of the two blades regardless of the collective pitch. The equalizing bar and the blade pivots operate during changes in collective pitch. During changes in cyclic pitch the blades and hub, being in effect locked together, rotate as a unit around pivot 20. This gives the effect of changing the pitch of both blades. The pitch of both blades is maintained by the connection of the blades through the push-pull rods 54 with the universal joint 62.

It is to be emphasized that the pilot has control over the helicopter while the pendulums 112 and 126 automatically control the helicopter. The control for the blades exerted through the gimbal ring 14 may be exerted in the absence of the pendulums. The control can operate with the pendulums removed and with the rods 108 and 124 and the rods 138 and 106 rigidly joined together. Under normal conditions a movement of the rod 124 by the pilot causes a like movement of the rod 108 because the pendulum remains perpendicular to the plane of the helicopter in normal flight. It is only when the helicopter assumes an angle not induced by the pilot that the pendulum 112 comes into effect. The rod 124 in that case would remain stationary in relationship to the helicopter and any movement of the helicopter away from the horizontal, with the pendulum remaining vertical, would induce a movement in rod 108 as if the pilot had moved the rod 124. Likewise, under normal conditions a movement of the rod 138 causes a like movement of the rod 106 because the pendulum remains perpendicular to the plane of the helicopter in normal flight. When the helicopter assumes an angle not induced by the pilot the pendulum 126 comes into effect. The rod 138 in that case would remain stationary in relationship to the helicopter and any movement of the helicopter away from the horizontal, with the pendulum remaining vertical, would induce a movement in rod 106 as if the pilot had moved the rod 138.

Having presented our invention we claim:

1. A pitch control apparatus for rotor blades: said pitch control apparatus comprising a tubular rotor mast, a gimbal ring, a set of first pivot means, said first pivot means connecting the gimbal ring to the tubular rotor mast, said gimbal ring being capable of rotating on the first pivot means, a rotor hub, a set of second pivot means, said second pivot means connecting the gimbal ring to the rotor hub, said rotor hub being capable of rotating on the second pivot means, two rotor blades, a third pivot means, said third pivot means connecting the blades to the rotor hub, said blades being spaced apart on said rotor hub, said blades being capable of rotating on the third pivot means, two push-pull rods in the tubular rotor mast, a pitch horn connecting with each push-pull rod and extending over the upper end of the rotor mast and connecting with a respective rotor blade, a spider integral with the tubular rotor mast, a passageway in said spider, a collective pitch shaft in said passageway, said pitch shaft being longitudinally movable in said passageway, said pitch shaft being keyed to said spider so as to rotate upon the rotation of the spider and the rotor mast, said collective pitch shaft connecting with said push-pull rods, a collective pitch control for raising and lowering the pitch shaft, and means connecting the collective pitch control and the pitch shaft and which means permits the pitch shaft to rotate.

2. A pitch control apparatus for rotor blades: said pitch control apparatus comprising a tubular mast, a first frame, a first pivot connecting the first frame and the tubular mast, said first frame being capable of rotating on the first pivot, a second frame, a second pivot connecting the second frame and the first frame, said second frame being capable of rotating on the second pivot, a rotor blade, a third pivot connecting the rotor blade to the second frame, said rotor blade being capable of rotating on the third pivot, a push-pull rod connecting with the rotor blade for varying the pitch of the blade, a cyclic pitch control means connecting with the push-pull rod, said cyclic pitch control means comprising a longitudinal control means and a lateral control means, said longitudinal control means and said lateral control means each comprising a means responsive to the vertical position so as to vary the position of the push-pull rod and the pitch of the blade.

3. A pitch control apparatus for rotor blades: said pitch control apparatus comprising a tubular rotor mast, a gimbal ring, a set of first pivot means, said first pivot means connecting the gimbal ring to the tubular rotor mast, said gimbal ring being capable of rotating on the first pivot means, a set of second pivot means, said second pivot means connecting the gimbal ring to the rotor hub, said rotor hub being capable of rotating on the second pivot means, two rotor blades, a third pivot means, said third pivot means connecting the blades to the rotor hub, said blades being spaced apart on said rotor hub, said blades being capable of rotating on the third pivot means, two push-pull rods in the tubular rotor mast, a pitch horn connecting with each push-pull rod and extending over the upper end of the rotor mast and connecting with a respective rotor blade, a spider integral with the tubular rotor mast, a cyclic pitch control arm connecting with the two push-pull rods, said cyclic pitch control arm capable of being moved so as to move the push-pull rods, a longitudinal control means and a lateral control means connecting with the cyclic pitch control arm, each of said longitudinal control means and said lateral control means comprising a freely hanging weight capable of assuming the vertical position and connecting means between the weight and the cyclic pitch control arm to influence the position of the push-pull rods.

4. A pitch control apparatus for rotor blades: said pitch control apparatus comprising a tubular mast, a first frame, a first pivot connecting the first frame and the tubular mast, said first frame being capable of rotating on the first pivot, a second frame, a second pivot connecting the second frame and the first frame, said second frame being capable of rotating on the second pivot, two rotor blades, a third pivot means connecting the rotor blades to the second frame, said rotor blades being capable of rotating on the third pivot means, two push-pull rods connecting with a respective rotor blade for varying the pitch of the blades, a collective pitch means connecting with the push-pull rods for moving the same and for varying the pitch of the blades, a cyclic pitch control means connecting with the push-pull rods, said cyclic pitch control means comprising a longitudinal control means and a lateral control means, said longitudinal control means and said lateral control means each comprising a means responsive to the vertical position so as to vary the position of the push-pull rod and the pitch of the blade.

5. A pitch control apparatus for rotor blades: said pitch control apparatus comprising a tubular rotor mast, a gimbal ring, a set of first pivot means, said first pivot means connecting the gimbal ring to the tubular rotor mast, said gimbal ring being capable of rotating on the first pivot means, a rotor hub, a set of second pivot means, said second pivot means connecting the gimbal ring to the rotor hub, said rotor hub being capable of rotating on the second pivot means, two rotor blades, a third pivot means, said third pivot means connecting the blades to the rotor hub, said blades being spaced apart on said rotor hub, said blades being capable of rotating on the third pivot means, two push-pull rods in the tubular rotor mast, a pitch horn connecting with each push-pull rod and extending over the upper end of the rotor mast and connecting with a respective rotor blade, a spider integral with the tubular rotor mast, a passageway in said spider, a collective pitch shaft in said passageway, said pitch shaft being longitudinally movable in said passageway, said pitch shaft being keyed to said spider so as to rotate upon the rotation of the spider and the rotor mast, said collective pitch shaft connecting with said push-pull rods, a collective pitch control for raising and lowering the pitch shaft, and means connecting the collective pitch control and the pitch shaft and which means permits the pitch shaft to rotate; a cyclic pitch control arm, a universal positioned between the cyclic pitch control arm and the collective pitch shaft in said passageway, said cyclic pitch control arm connecting with said collective pitch shaft, a longitudinal control means and a lateral control means connecting with the cyclic pitch control arm, and each of said longitudinal control means and said lateral control means comprising a freely hanging weight capable of assuming the vertical position and connecting means between the weight and the cyclic pitch control arm to influence the position of the collective pitch shaft.

6. A pitch control apparatus for rotor blades: said pitch control apparatus comprising a tubular rotor mast, a gimbal ring, a set of first pivot means, said first pivot means connecting the gimbal ring to the tubular rotor mast, said gimbal ring being capable of rotating on the first pivot means, a set of second pivot means, said second pivot means connecting the gimbal ring to the rotor hub, said rotor hub being capable of rotating on the second pivot means, two rotor blades, a third pivot means, said third pivot means connecting the blades to the rotor hub, said blades being spaced apart on said rotor hub, said blades being capable of rotating on the third pivot means, two push-pull rods in the tubular rotor mast, a pitch horn connecting with each push-pull rod and extending over the upper end of the rotor mast and connecting with a respective rotor blade, a spider integral with the tubular rotor mast, a cyclic pitch control arm connecting with the two push-pull rods, said cyclic pitch control arm capable of being moved so as to move the push-pull rods, a longitudinal control means and a lateral control means connecting with the cyclic pitch control arm, each of said longitudinal control means and said lateral control means comprising a freely hanging weight capable of assuming the vertical position and connecting means between the weight and the cyclic pitch control arm to influence the position of the push-pull rods; a passageway in said spider, a collective pitch shaft in said passageway, said pitch shaft being longitudinally movable in said passageway, said pitch shaft being keyed to said spider so as to rotate upon the rotation of the spider and the rotor mast, said collective pitch shaft connecting with said push-pull rods, a collective pitch control for raising and lowering the pitch shaft, and means connecting the collective pitch control and the pitch shaft and which means permits the pitch shaft to rotate.

7. A pitch control apparatus for rotor blades: said pitch control apparatus comprising a tubular rotor mast, a gimbal ring, a set of first pivot means, said first pivot means connecting the gimbal ring to the tubular rotor mast, said gimbal ring being capable of rotating on the first pivot means, a rotor hub, a set of second pivot means, said second pivot means connecting the gimbal ring to the rotor hub, said rotor hub being capable of rotating on the second pivot means, two rotor blades, a third pivot means, said third pivot means connecting the blades to the rotor hub, said blades being spaced apart on said rotor hub, said blades being capable of rotating on the third pivot means, two push-pull rods in the tubular rotor mast, each of said rods connecting with a respective rotor blade to vary the pitch of the same, a cyclic pitch control means connecting with the push-pull rods, said cyclic pitch control means comprising a longitudinal control means and a lateral control means, said longitudinal control means and said lateral control means each comprising a means responsive to the vertical position so as to vary the position of the push-pull rods and the pitch of the blades.

References Cited in the file of this patent

UNITED STATES PATENTS

| 2,380,582 | Cierva | July 31, 1945 |
| 2,383,139 | McGuire | Aug. 21, 1945 |
| 2,475,293 | Pentecost et al. | July 5, 1949 |
| 2,630,184 | Seibel | Mar. 3, 1953 |
| 2,845,131 | Laufer | July 29, 1958 |
| 2,961,051 | Wilford et al. | Nov. 22, 1960 |

FOREIGN PATENTS

| 5,459 | Great Britain | 1912 |
| 598,878 | Great Britain | Feb. 27, 1948 |